United States Patent [19]

Narumiya et al.

[11] 4,358,505

[45] Nov. 9, 1982

[54] INK ROLLER AND A METHOD OF PRODUCING THE SAME

[75] Inventors: Tsuneaki Narumiya; Take Sato, both of Yokohama; Shigeru Iwasawa, Kamakura, all of Japan

[73] Assignee: Bridgestone Tire Company Limited, Tokyo, Japan

[21] Appl. No.: 222,842

[22] Filed: Jan. 6, 1981

[30] Foreign Application Priority Data

Jan. 10, 1980 [JP] Japan .................................. 55-1651

[51] Int. Cl.[3] .............................................. B29D 27/00

[52] U.S. Cl. ...................................... 428/332; 264/26; 264/138; 264/321; 264/DIG. 66; 428/321.3; 521/50; 521/52

[58] Field of Search ......... 264/138, 321, 26, DIG. 66; 428/332, 321.3; 521/50, 52

[56] References Cited

U.S. PATENT DOCUMENTS

| | | | |
|---|---|---|---|
| 3,025,200 | 3/1962 | Powers | 264/321 X |
| 3,131,426 | 5/1964 | Legler | 264/321 X |
| 3,171,820 | 3/1965 | Volz | 264/321 X |
| 3,175,025 | 3/1965 | Geen et al. | 264/321 X |
| 3,334,169 | 8/1967 | Erceg et al. | 264/321 |
| 3,342,922 | 9/1967 | Karpovich et al. | 264/321 |
| 3,476,933 | 11/1969 | Mendelsohn | 264/321 X |
| 4,022,856 | 5/1977 | Maxey | 264/26 |
| 4,226,911 | 10/1980 | Haren | 264/49 X |

*Primary Examiner*—Philip E. Anderson
*Attorney, Agent, or Firm*—Sughrue, Mion, Zinn, Macpeak & Seas

[57] ABSTRACT

An ink roller and a method of producing the same are disclosed. This ink roller is produced by preheating a flexible polyurethane foam havng a three-dimensional skeletal reticulated structure and a pore size of 20–60 pores/cm at 130°–190° C., subjecting the preheated foam to permanent deformation through compression at a temperature of 130°–220° C. and a compressibility of $\frac{1}{3}$–1/15 and cutting the resulting compression body having a hardness of 15°–60° into a given shape in such a manner that the axial direction is coincident with the compression direction of the compression body.

5 Claims, 4 Drawing Figures

INK ROLLER AND A METHOD OF PRODUCING THE SAME

BACKGROUND OF THE INVENTION

This invention relates to ink rollers used for supplying ink to a face of a type or the like in a printer such as desk calculator, electronic computer, register and so on. This invention also relates to a method of producing the same.

In order to supply ink to the face of type or the like in a printer such as desk calculator, electronic computer, register, teletypewriter, typewriter and so on, the ink roller should desirably have a satisfactory ink-impregnation ability and a high ink-holding ability to prevent not only dripping of the ink in use but also the occurrence of blotting on paper. Further, the ink roller is required to supply a proper quantity of the ink to the face of the type without the uneven contact.

As an example of an ink roller of this type, there have hitherto been proposed ones made from compression bodies of flexible polyurethane foams. However, ink rollers satisfying all of the above requirements, particularly ink rollers having a long length (axial length) are not provided at present.

Moreover, when the ink roller is made from the compression body of the flexible polyurethane foam, it is cut out from the compression body along a direction perpendicular to the compression direction of the compression body. If the above ink roller is impregnated with an ink, it unevenly swells in its radial direction. As a result, the sectional form thereof produces an eccentricity from a true circle. In the production of the ink rollers, therefore, it is necessary to cut out the ink roller from the compression body in such a manner that the compression direction of the compression body is coincident with the axial direction of the ink roller.

In the conventional compression body of the flexible polyurethane foam, the permanent deformation is obtained by hot pressing the flexible polyurethane foam in a certain compression direction. However, the resin constituting the skeleton of the flexible polyurethane foam is low in the heat conductivity, so that heat transfer from a heat plate is poor during the hot pressing. Particularly, when the length in the compression direction of the flexible polyurethane foam is long, heat is not sufficiently transferred to the central portion of the foam. Further, the diameter of interconnected voids in the usual foam is small, so that the convection heating of air can hardly be expected. As a result, a large temperature gradient is produced in the flexible polyurethane foam during the hot pressing. Therefore, the resulting compression body produces a gradient of hardness or compressibility in its compression direction, a degree of which particularly becomes larger in case of the compression body having a large thickness in the compression direction. In this connection, there has been attempted techniques to rise the heating temperature or continue the heating over a long time to sufficiently heat the central portion of the flexible polyurethane foam during the hot pressing. But, in this case the heated surface portion of the compression body is degraded to such an extent that the compression body cannot be practically used.

Thus, it is very difficult to produce uniform ink rollers, particularly ink rollers having a long length (axial length) from such compression bodies. On the other hand, there are obtained only ink rollers having a relatively short axial length of about 10–15 mm, which is coincident with a width of a ribbon used in a typewriter.

There is a demand to produce large-size ink rollers with the advance of high-speed printing process in line printers or the like. Particularly, it is desired to develop uniform ink rollers having a length of not less than 20 mm and satisfying all of the aforementioned requirements. In electronic disk calculators and electronic cash registers wherein the ink roller is directly struck by a head of a type, for instance, it is required that the length of the ink roller is coincident with a width of the figures to be displayed. In the later case, the ink roller is required to have a length of more than about 50 mm, which is fairly longer than the conventional roller, and to be uniform.

SUMMARY OF INVENTION

An object of this invention is to meet the above mentioned demand and to provide ink rollers, which have high ink-impregnation and ink-holding abilities and evenly contact with faces of types and supply a proper quantity of an ink thereto.

According to the invention, an ink roller is composed of a compression body, which is obtained by subjecting a flexible polyurethane foam to permanent deformation through compression in a certain direction, and having an axial direction coincident with the compression direction of said compression body. The compression body is formed by permanently deforming a flexible polyurethane foam having a three-dimensional skeletal reticulated structure and a pore size of 20–60 pores per linear centimeter at a compressibility of $\frac{1}{3}$–1/15 and has a hardness of 15°–60° as measured by an Ascar's C-type rubber hardness tester (Japanese Rubber Associate Standard SR 1S-0101).

In the production of such ink rollers, the flexible polyurethane foam having the three-dimensional skeletal reticulated structure and the above defined pore size is preheated at a temperature of 130°–190° C., preferably by a high frequency heating process and then subjected to permanent deformation using a hot press heated to a temperature of 130°–220° C. at a compressibility of $\frac{1}{3}$–1/15 to form a compression body. From this an article suitable as an ink roller, e.g. columnar article or the like in such a manner that the axial direction of the article is coincident with the compression direction of the compression body is cut out. Thus, there are obtained articles, which are thick in the compression direction and uniform in both the axial direction and direction perpendicular to the axial direction. Therefore, ink rollers having a long length (axial length), for example, ink rollers having a length of not less than 20 mm can be produced simply and surely. Further, such ink rollers are high in the quality and satisfy all of the aforementioned requirements.

BRIEF DESCRIPTION OF THE DRAWING

The invention will now be described in detail with reference to the accompanying drawings, wherein.

DESCRIPTION OF THE PREFERRED EMBODIMENT

Figure 1:
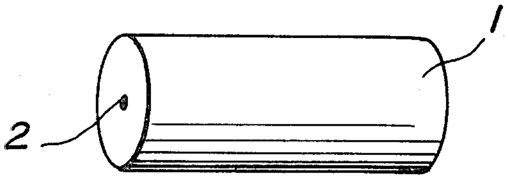
FIG. 1 is a perspective view of an embodiment of the ink roller according to the invention.
Figure 2:
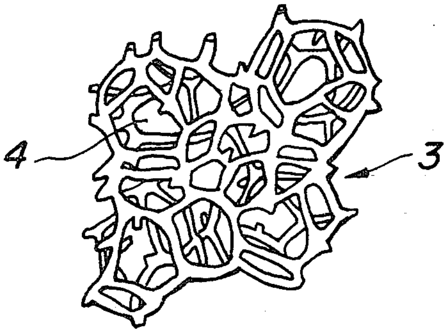
FIG. 2 is a partly enlarged perspective view of an embodiment of the flexible polyurethane foam having a three-dimensional skeletal reticulated structure to be used in the invention.

Referring to FIG. 1, numeral 1 is an embodiment of the ink roller formed into a column as a whole (numeral 2 is a through-hole receiving a roll shaft). The ink roller 1 is made from a compression body obtained by compressing a flexible polyurethane foam 3 having a three-dimensional skeletal reticulated structure as shown in FIG. 2. In this case, the axial direction of the ink roller 1 is coincident with the compression direction of the compression body. Moreover, interconnected voids 4 are flatly depressed in the compression direction (i.e. axial direction of the ink roller 1) during the hot pressing of the flexible foam 3, so that the ink roller 1 contains interconnected voids at a flatly depressed state (not shown). Since ink is impregnated in such interconnected voids, a proper quantity of the ink gradually seeps to the surface of the ink roller in use and is supplied to a face of a type contacting therewith.

According to the invention, the flexible polyurethane foam having the three-dimensional skeletal reticulated structure is used as a material for the production of the compression body, so that the resulting ink roller has a high ink-impregnation ability and can smoothly and evenly supply the ink to the face of the type. On the contrary, ink rollers made from conventional flexible polyurethane foam have drawbacks such that the liquid permeability is poor and hence the impregnation quantity of ink reduces and the like, so that they cannot accomplish the object of the invention.

As the flexible polyurethane foam having the three-dimensional skeletal reticulated structure, there are used ones having a pore size of 20–60 pores per linear centimeter. When the pore size is less than 20 pores/cm, the resulting ink roller is low in the ink-holding ability and causes the dripping of the ink and the blotting on paper in use or the like and also the ink-holding life becomes considerably shorter. However, when the pore size is more than 60 pores/cm, the impregnation quantity of ink reduces. In any case, the object of the invention cannot be achieved when the pore size is outside the defined range.

As previously mentioned, the ink roller according to the invention is made from the compression body of the flexible polyurethane foam having the three-dimensional skeletal reticulated structure, so that it is necessary to compress the foam at a compressibility of $\frac{1}{3}$–1/15. When the compressibility is less than $\frac{1}{3}$, the ink-holding ability is low, while when the compressibility is more than 1/15, the porosity lowers and hence the impregnation quantity of ink reduces.

In the resulting compression body (ink roller), the hardness should be within a range of 15°–60° as measured by an Ascar's C-type rubber hardness tester (Japanese Rubber Associate Standard SR 1S-0101). When the hardness is lower than 15°, the ink-holding ability is low, while when the hardness is higher than 60°, it is difficult to evenly contact the ink roller with the face of the type and hence a part of the printed letter is broken off.

According to the invention, the ink roller is produced by subjecting a flexible polyurethane foam having a three-dimensional skeletal reticulated structure and a pore size of 20–60 pores/cm to a permanent deformation at a compressibility of $\frac{1}{3}$–1/15 and has a hardness of 15°–60° so that not only the impregnation quantity of ink can be increased, but also the ink-holding ability can be improved. As a result, the dripping of the ink and the blotting on paper can be prevented and further a proper quantity of the ink can be supplied to the face of the type without uneven contact. Thus, ink rollers having excellent properties can first be obtained by correlating the kind of the flexible polyurethane foam (absence of cell membrane) as a starting material, the number of pores, the rate of permanent deformation through compression and the hardness of the compression body (i.e. ink roller) together with each other. Thus, the above limitations according to the invention should be correlated to each other. For instance, when the pore size is less than 20 pores/cm, the ink-holding ability becomes low as mentioned above, so that in order to compensate this drawback, the flexible polyurethane foam should be subjected to permanent deformation through compression at a compressibility of more than 1/15, but in this case the porosity lowers to reduce the impregnation quantity of ink and at the same time the hardness exceeds 60° to cause the uneven contacting with the type.

According to the invention, every one of polyester-type foams and polyether-type foams may be used as the flexible polyurethane foam. Moreover, the flexible polyurethane foam having the three-dimensional skeletal reticulated structure can be manufactured by subjecting the usual flexible polyurethane foam to a post-treatment such as treatment with an aqueous alkali solution, heat treatment and the like, or by using a compounding recipe for the formation of foams having a three-dimensional skeletal reticulated structure, or by using mechanical conditions for the formation of foams having a three-dimensional skeletal reticulated structure during the foaming.

In the production of ink rollers as mentioned above, it is necessary to produce a compression body by permanently deforming the flexible polyurethane foam having a three-dimensional skeletal reticulated structure and a pore size of 20–60 pores/cm through compression in a certain direction. In this case, the inside of the flexible polyurethane foam is preheated at a temperature of 130°–190° C., preferably 140°–170° C. before compression. This preheating can produce the uniform compression body as a whole without producing a hardness gradient or compressibility gradient in the compression direction even when the compression body is thicker in the compression direction. Thus, there can be obtained ink rollers which are uniform in both the axial direction and the direction perpendicular to the axial direction. On the other hand, it is very difficult to obtain uniform compression bodies (ink rollers), particularly compression bodies, which are thicker in the compression direction, without the preheating step. Moreover, when the preheating temperature is lower than 130° C., the compressibility becomes poorer in compression, while when the preheating temperature is higher than 190° C., it is apt to cause the heat decomposition of the foam.

As a preheating process, a process of heating the foam material in a constant temperature furnace or the like, a process of passing hot air through the inside of the foam material (interconnected voids 4 of the flexible polyurethane foam 3), and the like are acceptable, but a high frequency heating process is most suitable. Thus, since it is difficult to uniformly heat the flexible foam 3 as previously mentioned, the heating process in the constant temperature furnace not only takes a long time, but also is apt to cause heat degradation of the foam surface, while the hot air process is large in the pressure loss and low in the heat capacity of air, so that there is caused a problem of requiring large-size equipment. On the contrary, the high frequency heating process produces no problems as mentioned above and can simply and surely perform the preheating of the flexible polyurethane foam having the three-dimensional skeletal reticulated structure. In this way, it has first been demonstrated that the foam is satisfactorily preheated to 130°-190° C., which is an optimum temperature for the hot pressing, by the high frequency heating.

Then, the flexible polyurethane foam preheated at 130°-190° C. is subjected to permanent deformation through compression at a compressibility of $\frac{1}{3}$-1/15 using a hot press heated to 130°-220° C. When the hot pressing temperature is lower than 130° C., the compressibility is poor, while when the temperature is higher than 220° C., the surface of the foam is apt to be degraded. In the hot pressing step, the foam may also be heated at the same temperature from a direction perpendicular to the compression direction.

In the production of ink rollers according to the invention, the resulting compression body is cut into a columnar form or other form so that the axial direction of the ink roller is coincident with the compression direction of the compression body, whereby there can be obtained ink rollers which are uniform in both the axial direction and the direction perpendicular to the axial direction. On the contrary, if it is intended to directly produce ink rollers, particularly ink rollers having a length of more than 20 mm by compressing the flexible polyurethane foam material previously shaped into a columnar form or other form suitable for the ink roller in the axial direction, the relieving of the foam material is produced in a direction perpendicular to the axial direction to generate the hardness gradient and also the process precision is bad, so that the resulting ink rollers cannot be used practically.

The invention will further be described in the concrete with reference to the following example.

EXAMPLE

A flexible polyurethane foam having a three-dimensional skeletal reticulated structure, which has a rectangular solid of 370 mm height×500 mm width×500 mm length and a mean pore size of 28 pores/cm, was used and preheated to a temperature of 140°-161° C. by irradiating a frequency of 2,450 MHz with an output of 4 KWH at a rate of 0.1 KWH per 1 kg of the foam. Next, the preheated foam was placed in a hot pressing equipment as shown in FIG. 3, wherein an upper heat plate 5 and a lower heat plate 6 were heated to 170° C., and then compressed to a length of 55 mm by moving the lower plate 6 toward the upper plate 5 (an arrow direction shown in FIG. 3).

Figure 3:
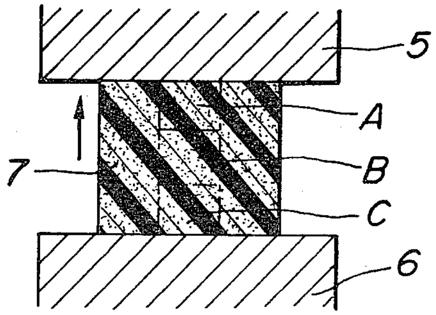
FIG. 3 is a diagrammatic sectional view of an embodiment of the hot pressing equipment used in the production of ink rollers.

In the central part of the compression body 7 as shown in FIG. 3, temperatures of portion A near the upper heat plate 5, central portion B and portion C near the lower heat plate 6 were measured with lapse of time.

For comparison, the change of temperatures in the portions A, B and C of the compression body produced by directly compressing the foam without preheating were measured in the same manner as described above.

Figure 4:
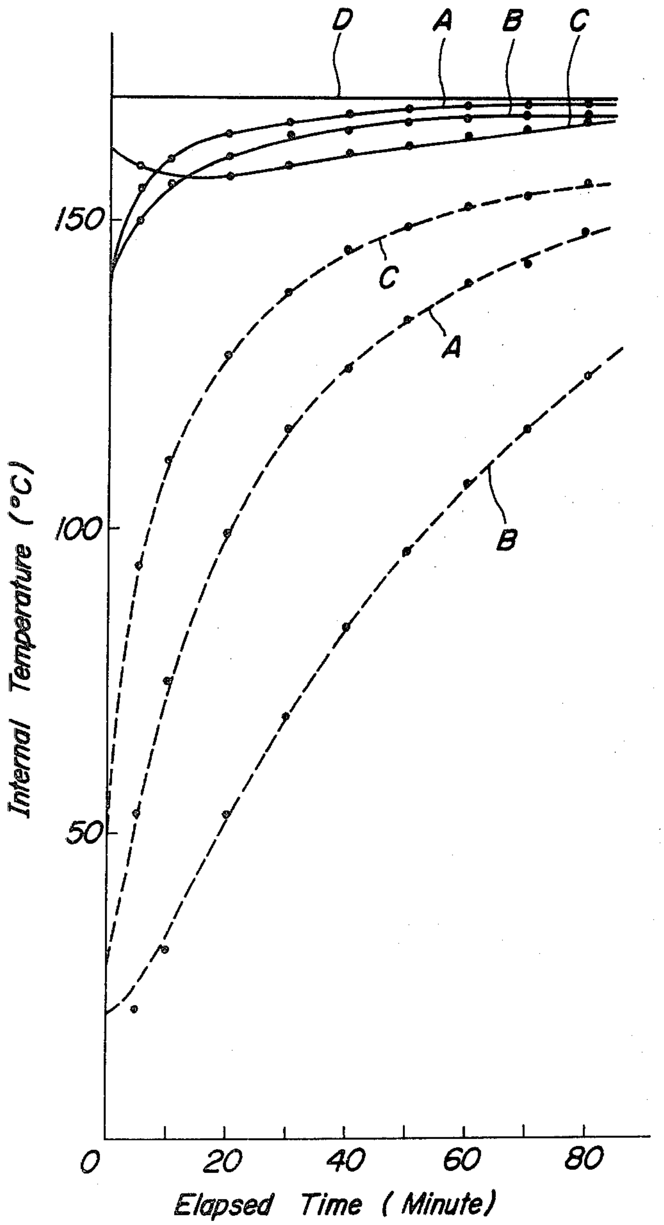
FIG. 4 is a graph showing a relation between the internal temperature at various positions of the flexible polyurethane foam during the hot pressing after or without the preheating and the elapsed time.

The measured results are shown in FIG. 4, wherein solid line curves A, B and C show the compression body produced by the hot pressing after the preheating (present invention), and dot dash lines curves A, B and C show the compression body produced by hot-pressing without the preheating (control). Moreover, a solid line D shows the temperature of the heat plate.

As apparent from the result of FIG. 4, when the foam is directly hot pressed without preheating, the temperature of the central portion B rises only to 125° C. even after 80 minutes, but does not reach to a temperature required for permanent deformation (In the flexible polyurethane foam, the temperature for permanent deformation is necessary to be not less than 130° C.), while the portions A and C near the heat plates reach to 148°-156° C., respectively. As a result, when the hot pressing is released after 80 minutes, the resulting compression body has a surface hardness of about 50° but is not permanently deformed in its interior. Therefore, uniform ink roller of the invention cannot be produced from such a compression body.

On the other hand, when the flexible foam is hot pressed after the preheating, it takes substantially a uniform time temperature curve, so that when the hot pressing is released after 80 minutes, the resulting compression body is uniform as the hardness of each portion thereof is 41°-43° . From this compression body a columnar ink roller having a length of 55 mm is cut out so that the axial direction is coincident with the compression direction. The resulting ink roller is large in the impregnation quantity of ink and high in the ink-holding ability and exudes a proper quantity of the ink from the surface in use.

As mentioned above, the ink roller according to the invention is not only large in the ink-holding quantity but also high in the ink-holding ability, so that there is no fear of causing dripping of the ink, the blotting on paper or the like in use. Furthermore, the ink roller according to the invention can evenly contact with a face of a type to supply a proper quantity of the ink thereto.

In the method of producing ink rollers according to the invention, ink rollers having a length of not less than 20 mm can be produced simply and surely and are uniform as a whole in both the axial direction and the direction perpendicular to the axial direction.

What is claimed is:

1. In an ink roller composed of a compression body, which is obtained by subjecting a flexible polyurethane foam to permanent deformation through compression in a certain direction, and having an axial direction coincident with the compression direction of said compression body, the improvement wherein said compression body is formed by permanently deforming a flexible polyurethane foam having a three-dimensional skeletal reticulated structure and a pore size of 20-60 pores per linear centimeter at a compressibility of $\frac{1}{3}$-1/15 and has a hardness of 15°-60° as measured by an Ascar's C-type rubber hardness tester (Japanese Rubber Associate Standard SR 1S-0101).

2. An ink roller as claimed in claim 1, wherein said ink roller has a length of not less than 20 mm.

3. A method of producing ink rollers comprising preheating a flexible polyurethane foam having a three-dimensional skeletal reticulated structure and a pore size of 20-60 pores per linear centimeter at a temperature of 130°-190° C., compressing the preheated foam at a compressibility of $\frac{1}{3}$-1/15 using a hot press heated to a temperature of 130°-220° C. to conduct permanent deformation, and cutting the resulting compression body into a given shape in such a manner that the axial direction is coincident with the compression direction of said compression body.

4. A method as claimed in claim 3, wherein said flexible polyurethane foam is preheated by a high frequency heating.

5. A method as claimed in claim 3, wherein said preheating temperature is 140°-170° C.

* * * * *